US010677094B2

(12) United States Patent
Uhkötter et al.

(10) Patent No.: US 10,677,094 B2
(45) Date of Patent: Jun. 9, 2020

(54) TRANSFER COUPLINGS

(71) Applicants: ROLLS-ROYCE plc, London (GB); ROLLS-ROYCE DEUTSCHLAND LTD & CO KG, Blankenfelde-Mahlow, Dahlewitz (DE)

(72) Inventors: Stephan Uhkötter, Berlin (DE); Ulrich Adamczewski, Berlin (DE); Jack Francis Colebrooke, Bristol (GB)

(73) Assignees: ROLLS-ROYCE PLC, London (GB); ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 78 days.

(21) Appl. No.: 16/113,325

(22) Filed: Aug. 27, 2018

(65) Prior Publication Data

US 2019/0003336 A1   Jan. 3, 2019

Related U.S. Application Data

(62) Division of application No. 15/091,053, filed on Apr. 5, 2016, now Pat. No. 10,087,779.

(30) Foreign Application Priority Data

Apr. 30, 2015 (GB) .................................... 1507390.1
Sep. 18, 2015 (GB) .................................... 1516542.6

(51) Int. Cl.
*F16H 57/04* (2010.01)
*F01D 25/18* (2006.01)
(Continued)

(52) U.S. Cl.
CPC ................ *F01D 25/18* (2013.01); *F02C 7/06* (2013.01); *F02C 7/36* (2013.01); *F16H 1/28* (2013.01);
(Continued)

(58) Field of Classification Search
CPC .. F01D 25/18; F16H 57/0427; F16H 57/0486; F16H 57/0473; F16L 37/50;
(Continued)

(56) References Cited

U.S. PATENT DOCUMENTS 2,988,325 A   6/1961  Dawson
2,999,000 A   9/1961  Spat
(Continued)

FOREIGN PATENT DOCUMENTS

CH        571658 A5    1/1976
CN      103291884 A    9/2013
(Continued)

OTHER PUBLICATIONS

Oct. 20, 2015 Search Report issued in British Patent Application No. 1507390.1.
(Continued)

*Primary Examiner* — Roger L Pang
(74) *Attorney, Agent, or Firm* — Oliff PLC

(57) ABSTRACT

A transfer coupling includes a static component and a rotatable component arranged concentrically, the static component including a first number of radially extending ports and the rotatable component having a second number of radially extending ports the radially extending ports arranged in a common circumferential plane wherein the ports are configured and arranged, in use, to homogenise a flow area for a fluid being transferred through the ports and thereby create a homogenous volume flow.

10 Claims, 10 Drawing Sheets

(51) Int. Cl.
    *F02C 7/36*     (2006.01)
    *F16H 1/28*     (2006.01)
    *F02C 7/06*     (2006.01)
    *F16L 25/10*     (2006.01)
    *F16L 37/50*     (2006.01)

(52) U.S. Cl.
    CPC ........... *F16H 57/04* (2013.01); *F16H 57/043* (2013.01); *F16H 57/0427* (2013.01); *F16H 57/0486* (2013.01); *F16L 25/10* (2013.01); *F16L 37/50* (2013.01); *F05D 2260/40* (2013.01); *F05D 2260/406* (2013.01); *F05D 2260/40311* (2013.01); *F05D 2260/98* (2013.01)

(58) Field of Classification Search
    CPC ........ F02C 7/36; F02C 7/06; F05D 2260/406; F05D 2260/40311; F05D 2260/98
    USPC .................................................. 475/159, 160
    See application file for complete search history.

(56) References Cited

U.S. PATENT DOCUMENTS

| | | | |
|---|---|---|---|
| 3,259,210 A | 7/1966 | Beebe et al. | |
| 3,791,758 A | 2/1974 | Jenkinson | |
| 3,990,812 A | 11/1976 | Radtke | |
| 4,178,129 A | 12/1979 | Jenkinson | |
| 4,236,869 A | 12/1980 | Laurello | |
| 4,468,066 A * | 8/1984 | Alcorta | F01D 25/18 384/462 |
| 4,567,784 A | 2/1986 | Hambric | |
| 4,756,631 A | 7/1988 | Jones | |
| 5,193,915 A | 3/1993 | Leidenfrost | |
| 5,529,347 A | 6/1996 | Lee | |
| 5,669,844 A | 9/1997 | Homan et al. | |
| 2005/0135714 A1 | 6/2005 | Rahman et al. | |
| 2005/0286824 A1 | 12/2005 | Garcia | |
| 2008/0108471 A1 | 5/2008 | Deutsch et al. | |
| 2008/0273822 A1 | 11/2008 | Le et al. | |
| 2013/0000313 A1 | 1/2013 | Udall | |
| 2014/0028016 A1 | 1/2014 | Knapke | |
| 2015/0330442 A1 * | 11/2015 | Futae | F16C 17/18 415/111 |
| 2016/0160993 A1 | 6/2016 | Venter | |
| 2017/0074319 A1 | 3/2017 | Sydnor | |

FOREIGN PATENT DOCUMENTS

| | | |
|---|---|---|
| DE | 1043718 B | 11/1958 |
| EP | 0188910 A1 | 7/1986 |
| EP | 2078888 A1 | 7/2009 |
| EP | 3029357 A1 | 6/2016 |
| EP | 3029359 A1 | 6/2016 |
| FR | 2135319 A1 | 12/1972 |
| FR | 2381179 A1 | 9/1978 |
| FR | 2543654 A1 | 10/1984 |
| FR | 2862908 A1 | 6/2005 |
| JP | S61-136059 A | 6/1986 |
| SU | 796585 A | 1/1981 |
| WO | 2007/058028 A1 | 5/2007 |
| WO | 2011/120771 A1 | 10/2011 |

OTHER PUBLICATIONS

Mar. 10, 2016 Search Report issued in British Patent Application No. 1516542.6.
U.S. Appl. No. 15/090,970, filed Apr. 5, 2016.
Sep. 30, 2016 Search Report issued in European Patent Application No. 16163651.
Sep. 29, 2016 Search Report issued in European Patent Application No. 16163650.
U.S. Appl. No. 15/091,053, filed Apr. 5, 2016 in the name of Uhkötter et al.
Dec. 23, 2016 Search Report issued in European Patent Application No. 16163651.
Jan. 20, 2017 Search Report issued in European Patent Application No. 16163650.1.
Sep. 26, 2017 Office Action issued in U.S. Appl. No. 15/090,970.
Oct. 24, 2017 Office Action issued in U.S. Appl. No. 15/091,053.
Dec. 12, 2017 Search Report issued in European Patent Application No. 17185332.8.
Mar. 13, 2018 Office Action issued in U.S. Appl. No. 15/090,970.
Mar. 15, 2018 Ex Parte Quayle Action issued in U.S. Appl. No. 15/091,053.

* cited by examiner

TRANSFER COUPLINGS

CROSS-REFERENCE TO RELATED APPLICATIONS

This is a Division of application Ser. No. 15/091,053 filed Apr. 5, 2016, which claims the benefit of British Application No. 1507390.1 filed Apr. 30, 2015 and British Application No. 1516542.6 filed Sep. 18, 2015. The disclosure of the prior applications are hereby incorporated by reference herein in their entirety.

FIELD OF THE INVENTION

The present disclosure concerns the controlled distribution of fluid through a transfer coupling between coaxially aligned static and rotating structures.

BACKGROUND OF THE INVENTION

It is common in electro-mechanical machinery for a rotating structure to be coupled to a radially internal or radially external static structure. It is often necessary to transfer fluids between the static and rotating structure. This can be achieved by providing openings in the rotating and static part of a coupling, when the openings are in alignment, fluid can be transferred across the coupling. A problem arising with this arrangement is the interruption of flow which occurs when the openings are out of alignment and the extreme variation in flow area as the openings come in and out of alignment.

One solution which has been adopted is the use of baffles within or around the couplings to buffer the flow. Whilst this solution can be effective, the additional complexity and weight of the solution renders it unattractive or impractical in some applications.

STATEMENT OF THE INVENTION

According to a first aspect there is provided a transfer coupling comprising a static component and a rotatable component arranged concentrically, the static component including a first number of radially extending ports and the rotatable component including a second number of radially extending ports the radially extending ports arranged in a common circumferential plane wherein; the ports are configured and arranged, in use, to homogenise flow area for a fluid being transferred through the ports and thereby create a homogenous volume flow.

Various embodiments of transfer coupling in accordance with the invention are contemplated. The port arrangements described herein share the common feature that they serve to reduce the interruption of flow which occurs when ports are out of alignment and reduce and desirably minimise variation in flow area as the ports come in and out of alignment. In the Applicant's UK Patent application no. 1507390.1 from which this application claims priority, one specific embodiment embracing this concept is described. The specific arrangement described is a transfer coupling comprising a static component and a rotatable component arranged concentrically, the static component including a first number of radially extending ports and the rotatable component comprising a second number of radially extending ports. The radially extending ports are arranged in a common circumferential plane wherein;
the ports on each component are equally spaced around the component and the number of ports on a first of the components (n−1) is one less than the number of ports (n) on the second of the components. The packing factor of the ports on the first of the components may be at least 40%, more desirably 50% or greater.

The term "equally spaced" is to be interpreted broadly. It is to be understood that the benefits of the invention can still be achieved if the separation between ports is not precisely consistent. The determining factor will be that the spacing between ports is not so inconsistent as to result in a measurable and detrimental occurrence of back pressure pulses in the flow during each cycle of the coupling. In some embodiments, the first of the components is the static component and the static component sits radially outboard of the rotatable component or in axial alignment.

In another embodiment, each of the static and rotating components have a circumferential wall comprised substantially of a porous material. The pores may be in varying shapes and sizes and arranged randomly. The packing factor is desirably consistent, or within, for example +/−20% of an average packing factor around the circumference of each component.

In another embodiment, each of the static and rotatable components is provided with ports which are elongate slots. The slots on a first of the components are all arranged with their main axis inclined to the co-axis of the components at a first angle and the slots on the second of the components are all arranged with their main axis inclined to the co-axis of the components at a second angle (different from the first. The first and second angle may be equal but opposite in sign. The number of slots on each component may be substantially equal. The slots may be equally spaced.

In another embodiment a first of the static component and the rotatable component comprises a circumferential array comprising a first number of ports of a first size and the second of the components comprises a circumferential array comprising a second number of ports of a second size, the first number being substantially smaller than the second number and the first size being substantially larger than the second size. The array of ports on each component may have similar packing factors. For example, the first component has an array of ports comprising a single row of equally spaced circular ports having a first diameter D and the second component has an array of ports comprising x rows of equally spaced circular ports each having a diameter of about 1/x. For example, x may be in the range 1.5 to 3. X may be 2.

In another embodiment, a first of the static component and the rotatable component comprises a circumferential channel and the second of the components comprises a circumferential array of similar sized ports equally spaced along the circumference in one or more rows. The size of ports in each row might be the same or different. The ports may be of any practical shape. For example, the ports comprise a single row of circular parts having a diameter d which is close or equal to the width of the circumferential channel. The packing factor of the array may be 50% or greater.

Except where explicitly specified as not, the ports on a component may be of consistent shape and size. The ports on each component may share the same geometry. For example (but without limitation), the ports may be presented as axially extending slots or round holes. In some embodiments, the packing factor of ports on the first of the components is at least 40%. In more particular embodiments, the packing factor on the first of the components is 50% or greater.

It will be understood that various component design factors will dictate optima for port size, separation between ports and port geometry. For example (without limitation) such design factors include; ease and cost of manufacture, structural and other material requirements for each component of the coupling, flow rates and quantity of fluids to be transferred through the coupling and the like. The embodiments described herein contemplate some of these design factors, however, the invention is not intended to be limited to embodiments where design is influenced by such factors.

The packing factor is the sum of the port diameters, or chord widths for non-circular holes, divided by the circumference of the component.

If 'n' is the number of ports in the component, then . . .

$$\text{packing factor} = \frac{n\phi_{radial\ hole}}{\pi\phi_{component}}$$

So as an example (without limitation), a component of circumference of 200 mm, with 10×10 mm diameter ports would have a packing factor of 50%. Or, the distance between the ports is the same as the diameter of the ports.

In some embodiments, the ports are arranged at an incline to the radius, this can reduce pressure drop through the coupling.

The coupling of the invention is applicable to any rotating fluid coupling requirement. Examples (without limitation) of such couplings include; oil transfer couplings, gas transfer couplings and rotary shaft unions. One particular application is in a gear box, a more specific application is in a planetary epicyclic gear box.

Through mathematical modelling, the inventors have identified parameters in the design of a transfer coupling which maximise the total open area of the coupling over a complete rotation.

Significant parameters were identified as; spacing of the ports on the components, packing factor of the ports, the relative number of ports on each component of the coupling.

Unequal spacing of ports will result in variations in the open area through the coupling as the components relatively rotate. These cyclic variations can result in back pressure pulses at points in the cycle when the area contracts. By spacing the ports substantially equally, a much smoother flow through the coupling can be achieved.

As with the spacing of the ports, there is a mathematical prediction for optimum flow. Predictions recommend a packing factor of 50% or greater, however, the determining factor will be that the density is not so small as to result in a measurable and detrimental occurrence of back pressure pulses in the flow during each cycle of the coupling.

A lower packing factor on one of the components requires an increased packing factor on the other component if the through flow requirements are to be met. If the packing factors between the couplings are too diverse, then the result can be similar to that for significantly unequal spacing. The increased difference in port numbers increases the back pressure pulses from the device.

It will be understood that the total number of ports is related to (among other parameters) the packing factor. The larger the coupling, the greater the number of ports (assuming the port dimensions remain substantially the same). The dimensions of the ports relative to the coupling components will also affect the packing factor.

The coupling can be arranged for transfer of fluids from a radially outward space to a radially inward space, or from a radially inward space to a radially outward space, or in an axial direction between axially aligned components. For example (but without limitation) the coupling may be arranged for transferring lubricant from a reservoir in a static structure to moving parts in a rotating structure.

As mentioned above, couplings of the invention can be used to assist in delivery of a smooth flow of oil to a planetary gear box. In one aspect, the invention provides a gas turbine engine having a planetary gear box wherein the planet carrier of the planetary gear box is coupled to a radially outboard static housing by a coupling in accordance with the invention. One or both of the components of the coupling of the invention may be integrally formed with structures being coupled.

BRIEF DESCRIPTION OF THE DRAWINGS

Embodiments of the invention will now be described by way of example with reference to the accompanying Figures in which.

DETAILED DESCRIPTION OF DRAWINGS AND EMBODIMENTS

Figure 1:
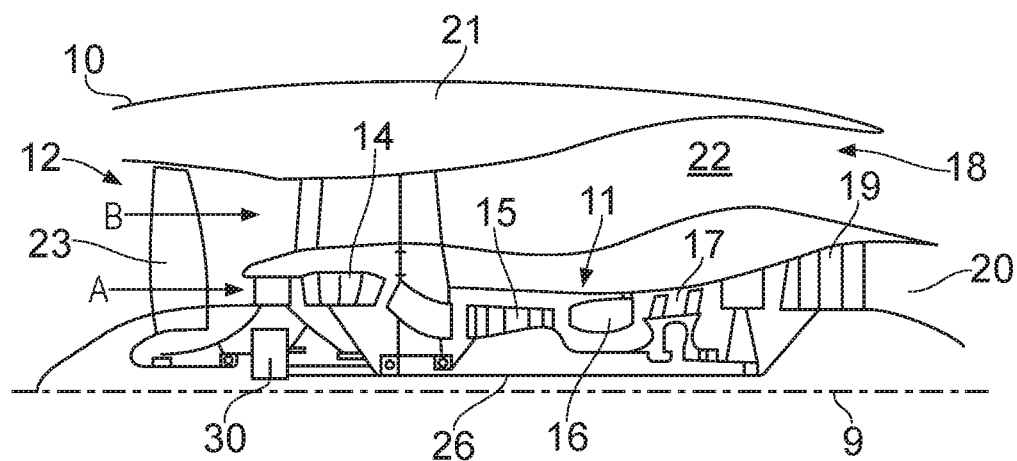
FIG. 1 is a sectional side view of a gas turbine engine having a geared fan.
Figure 2:
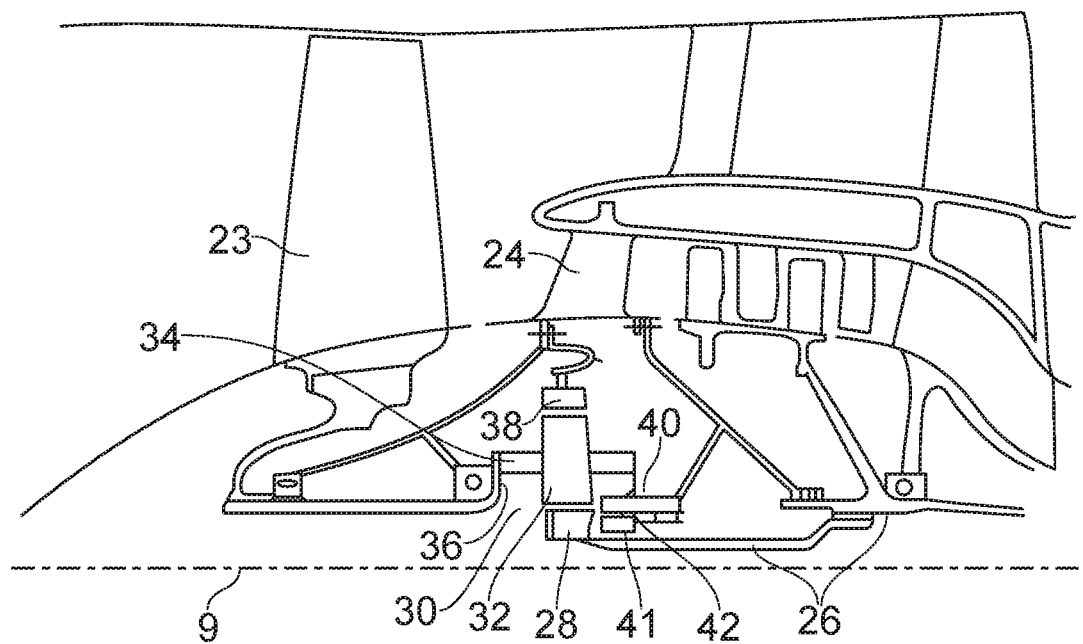
FIG. 2 is an enlargement of a planetary arrangement epicyclic gearbox used in the gas turbine engine of FIG. 1 and coupled to a static housing by means of a transfer coupling in accordance with the present invention.

Referring to FIGS. 1 and 2, a two-shaft gas turbine engine 10 has a principal rotational axis 9. The engine 10 comprises an air intake 12 and a propulsive fan 23 that generates two airflows A and B. The gas turbine engine 10 comprises a core engine 11 having, in axial flow A, a low pressure booster compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via shaft 26 and epicyclic gearbox 30.

The gas turbine engine 10 works in a conventional manner so that air in the core airflow A is accelerated and compressed by the high pressure booster compressor 14 and directed into the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 normally provides the majority of the propulsive thrust.

A known mechanical arrangement for a two-shaft geared fan gas turbine engine 10 is shown in FIG. 1. The low pressure turbine 19 drives the shaft 26, which is coupled to a sun wheel, or sun gear, 28 of the epicyclic gear arrangement 30. Radially outwardly of the sun gear 28 and intermeshing therewith, in conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis independently. The planet carrier 34 is coupled via linkages 36 to the fan 23 in order to drive its rotation about the engine axis 9. Radially outwardly of the planet gears 32 and intermeshing therewith is an annulus or ring gear 38 that is coupled to stationary structure 24. As can be seen, the transfer coupling of the invention 40 sits on the carrier 34. The rotatable component 41 (see FIG. 3) rotates with carrier 34, the static component 42 of the coupling is mounted to a stationary structure 24 in a fixed position radially outboard of the rotatable component 41.

Figure 3:
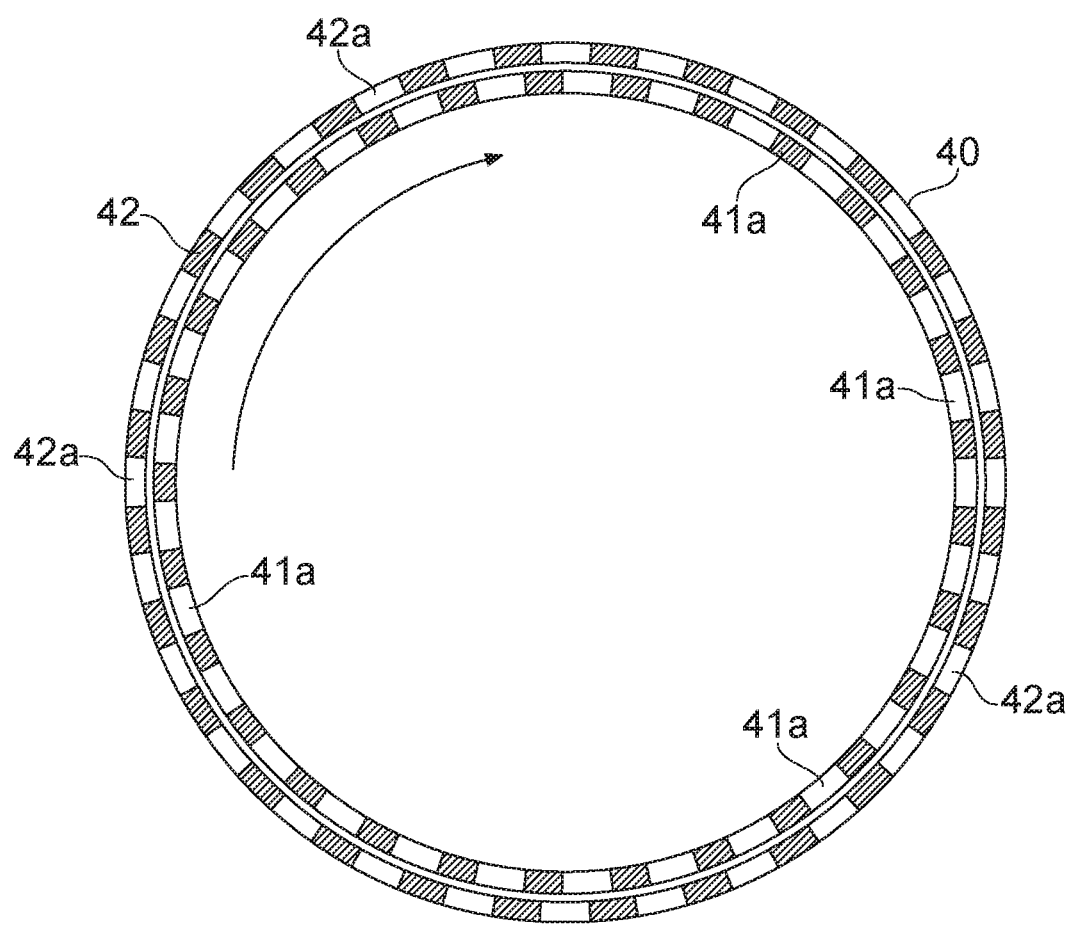
FIG. 3 is a section through a coupling in accordance with the present invention.

FIG. 3 shows a section through a transfer coupling 40 in accordance with the invention. In particular, the figure shows the arrangement of ports 41a, 42a in each of the components. The coupling comprises an outer ring 42 which, in use, is secured in a fixed rotational position to a stationary structure (for example structure 24 of FIG. 2). Radially inwardly and in close radial contact with the stationary component 42 is a rotatable component 41 which, in use, is secured to a rotating structure (such as sun gear 28) such that the rotatable component rotates relative to the stationary component 42, with the rotating structure.

As can be seen, the ports 41a, 42a in each of the components of the coupling are substantially equally spaced about the annulus. The outer, stationary component 42 has twenty-eight substantially identical ports 42a. The circumferential dimensions of the ports along the circumference of the coupling are very similar to that of the gaps between them creating a circumferential packing factor of about 50%.

The inner, rotatable component 41 has twenty-nine substantially identical ports 41a. Again, the dimensions of the ports along the circumference of the coupling are very similar to that of the gaps between them creating a circumferential packing factor of about 50%.

In use, the inner rotatable component 41 rotates relative to the stationary component 42 in the direction shown by the arrow (though this is not essential). As can be seen, at the illustrated rotational position, there is a significant majority of ports 41a of the rotatable component in fluid communication with ports 41b. Since the arrangement of the ports on each component is rotationally symmetrical, this will be the state of the coupling at any rotational position of the rotatable component, only angularly shifted.

Figure 4:
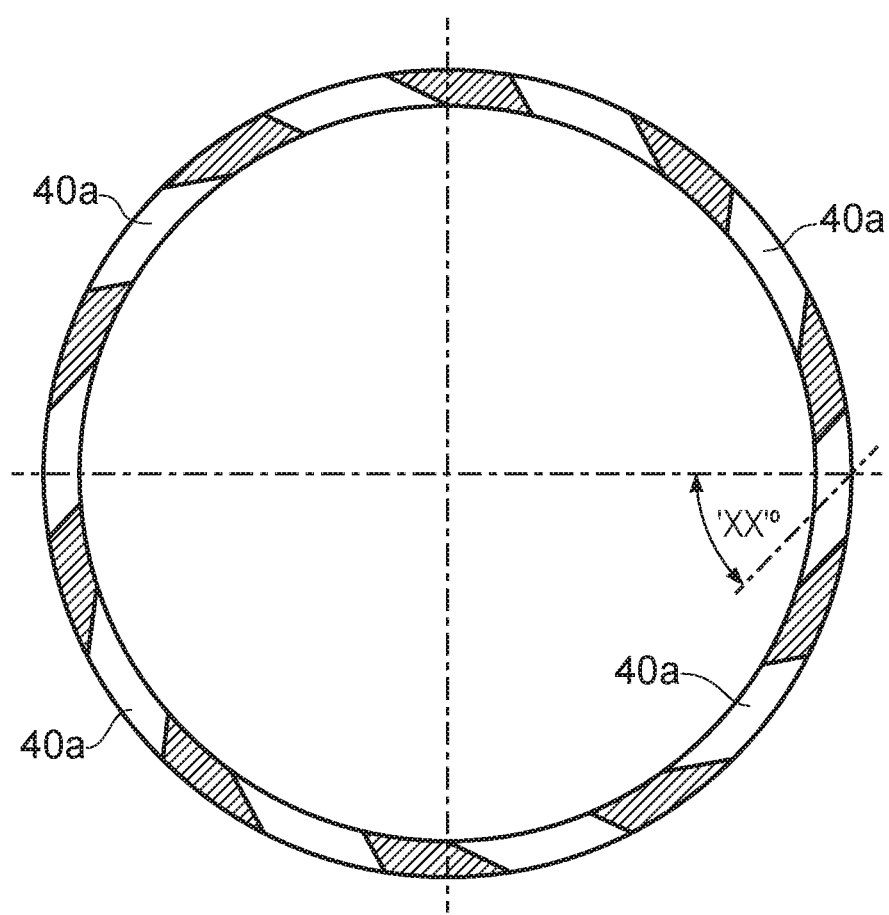
FIG. 4 is a section through a component of a second embodiment of a coupling in accordance with the present invention.

FIG. 4 shows a component of a coupling in accordance with the invention. The arrangement of ports 40a shown may be applied to either or both of the structural and rotatable components of a coupling of the invention.

Figure 5:
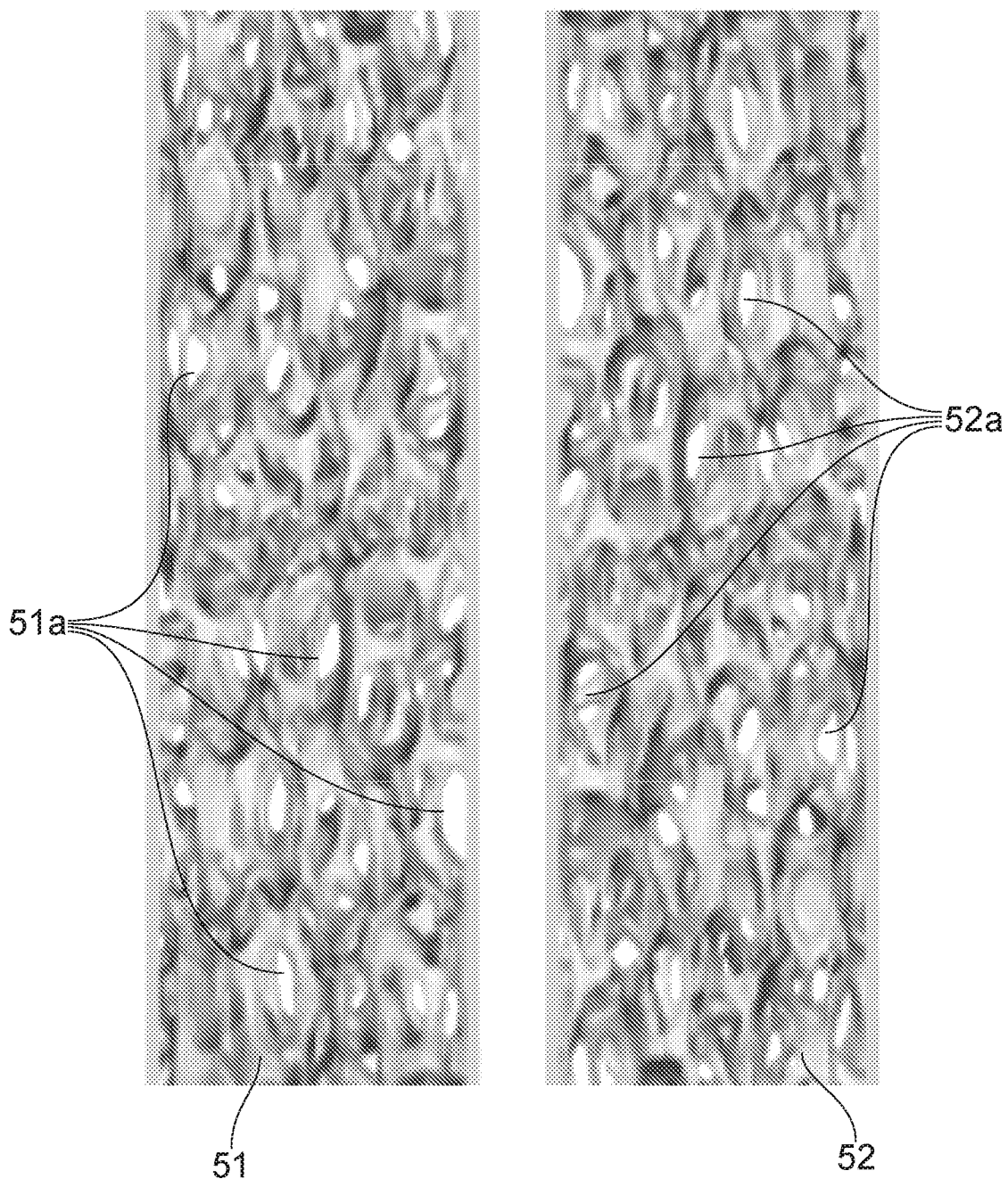
FIG. 5 is a schematic of a third embodiment of a coupling in accordance with the present invention.

FIG. 5 shows sections of the first 51 and second 52 component of a coupling in accordance with an embodiment of the invention arranged side by side so that the surface geometry of each component can be seen. Each component has a non-homogenous porous surface extending around its entire circumference. The pores vary in size and shape and are arranged in a random pattern. In general the pores are significantly smaller and significantly more numerous than in prior art arrangements. The pore density in each is desirably about 50% or greater. It will be appreciated that by removing the repeating pattern of the pores combined with the increase in number of pores, the interruption of flow which occurs when openings are out of alignment and the variation in flow area as the openings come in and out of alignment is less periodic and lesser in magnitude than experienced in the prior art arrangements.

Figure 6:
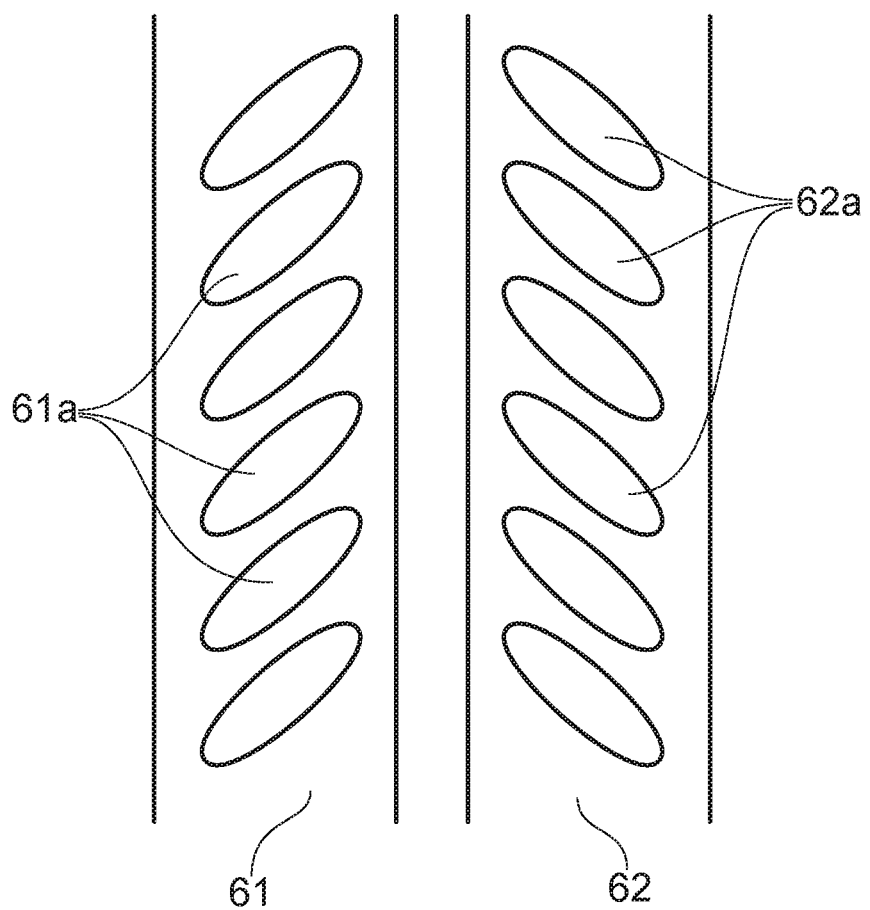
FIG. 6 is a schematic of a fourth embodiment of a coupling in accordance with the present invention.

FIG. 6 shows sections of the first 61 and second 62 component of a coupling in accordance with an embodiment of the invention arranged side by side so that the surface geometry of each component can be seen. In this arrangement, each of the components is provided with a circumferential array of oval slots 61a, 62a. The slots in each component are of substantially the same size and shape and are substantially equally spaced along the circumference. The longitudinal axis of the slots is inclined at an angle to a centre line of the circumference and also, in use, to a co-axis shared by the components. It will be noted that the incline of the slots 61a in the first component 61 is in an opposite direction to the incline of the slots 62a of the second component 62. This opposite incline of the slots provides for reduced variation in the flow area as the slots 61a, 62a pass over each other, thereby maintaining a continuous and relatively steady flow across the coupling.

Figure 7:
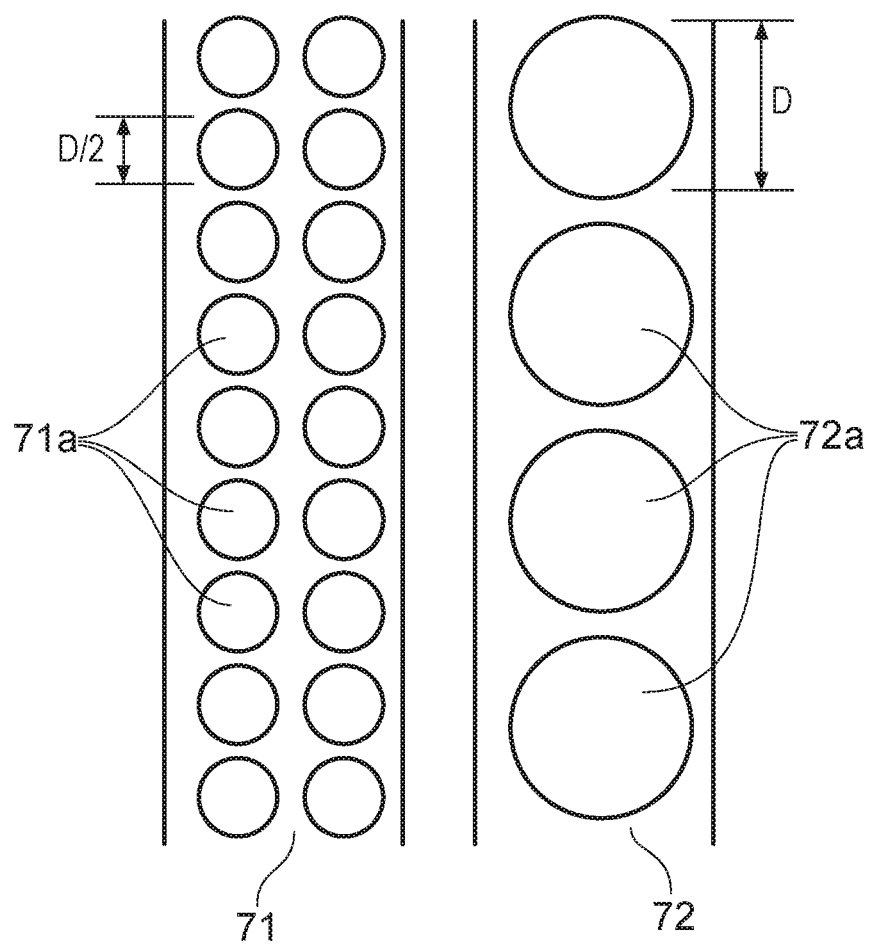
FIG. 7 is a schematic of a fifth embodiment of a coupling in accordance with the present invention.

FIG. 7 shows sections of the first 71 and second 72 component of a coupling in accordance with an embodiment of the invention arranged side by side so that the surface geometry of each component can be seen. A first of the components 71 is provided with a first circumferential array of ports 71a. The circular ports 71a are arranged in two parallel rows around the circumference. The ports have a diameter D/2. The second component is provided with a second circumferential array of ports 72a. The circular ports are arranged in a single row around the circumference. Each of the ports 72a has a diameter D, two times that of the ports 71a in the first component 71. It will be appreciated that, as one component rotates relative to the other, at any one time at least four of the ports of the first component are aligned with a port of the second component. As the line of sight of any two of the smaller ports 71a is blocked by a wall between the larger ports 72a at one extreme of the port, two others come into alignment at an opposite extreme of the larger port 72a.

Figure 8:
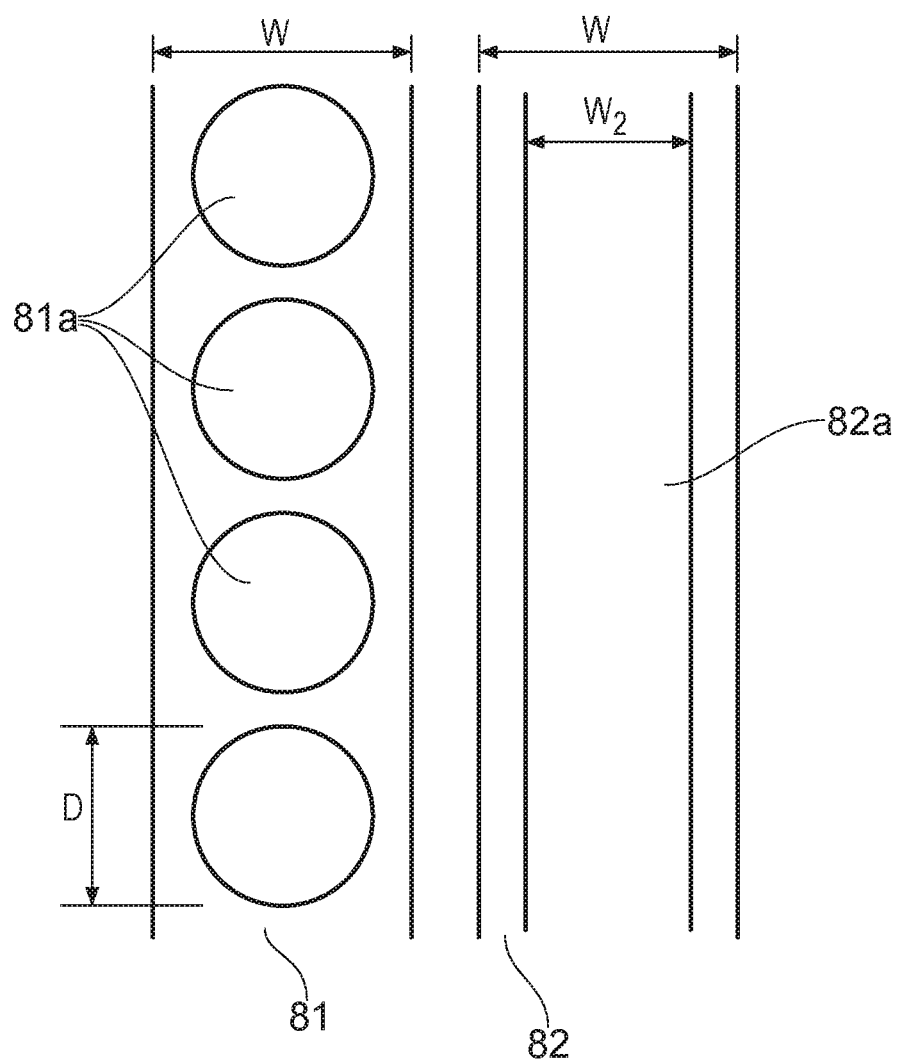
FIG. 8 is a schematic of a sixth embodiment of a coupling in accordance with the present invention.

FIG. 8 shows sections of the first 81 and second 82 component of a coupling in accordance with an embodiment of the invention arranged side by side so that the surface geometry of each component can be seen. A first of the components 81 is provided with a first circumferential array of ports 81a. The circular ports 81a are arranged in a single row around the circumference. Similar to the arrangement of the second component in FIG. 7, the diameter D of the ports extends across a substantial part of the width W of the component. For example the diameter is 75% or greater of the width W of the component. The second component 82 is provided with a circumferential channel 82a which has a width $W_2$ which is substantially the same size as the diameter D of the ports 81a. The width $W_2$ need not be the same as diameter D. For example the width $W_2$ may be equal to D+/−10%. In alternative arrangements, the first array 81a may comprise multiple rows and/or the shape of the ports 81a may be non-circular.

Figure 9:
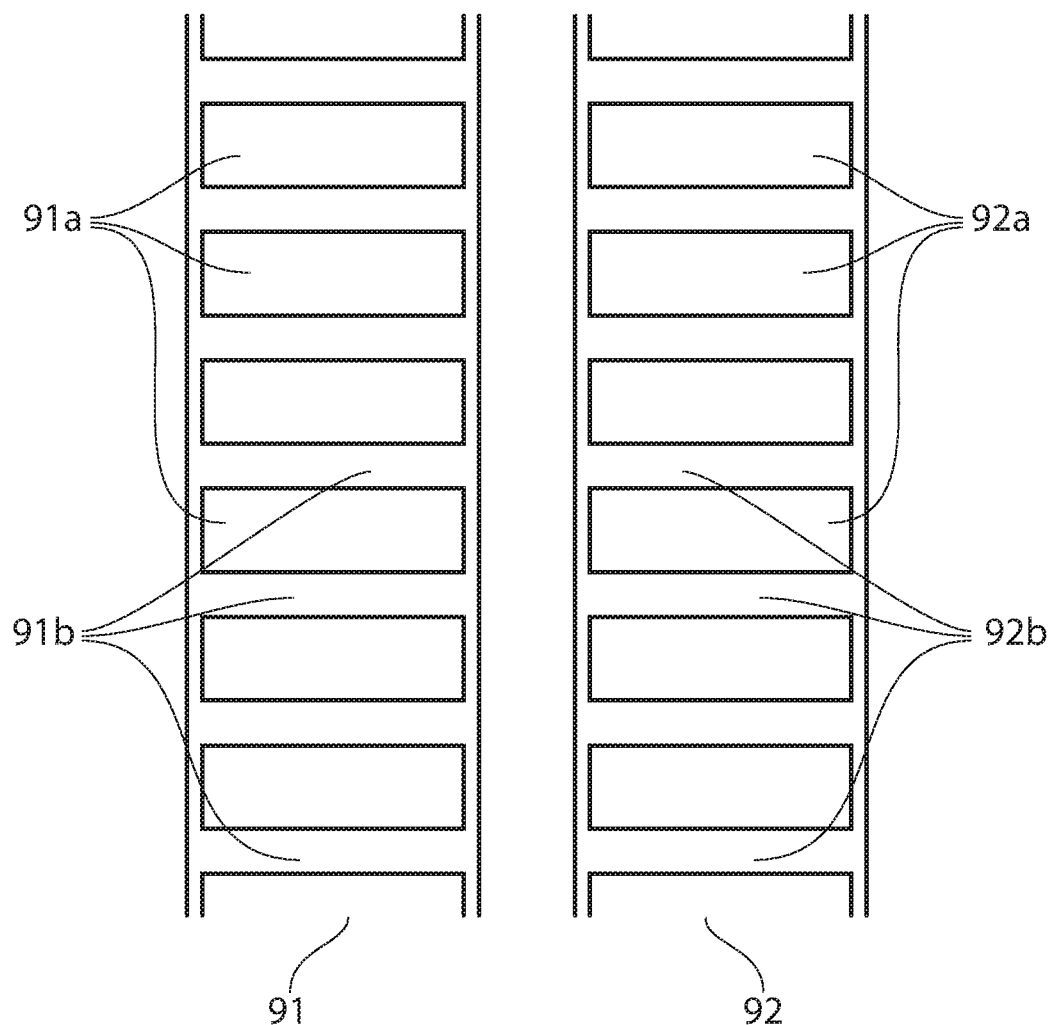
FIG. 9 is a schematic of a seventh embodiment of a coupling in accordance with the present invention.

FIG. 9 shows sections of the first 91 and second 92 component of a coupling in accordance with an embodiment of the invention arranged side by side so that the surface geometry of each component can be seen. In this arrangement, the components 91, 92 are each formed from a web which comprises two annuli held together by an array of struts 91b, 92b which are separated by spaces 91a, 91b. The spaces serve as the ports of the two components. The web is designed to provide a maximum open area in the component circumferences, whilst retaining structural integrity of the component. In a circumferential direction, the struts 91b, 92b have a substantially smaller dimension than the spaces 91a, 91b. For example, the dimension of the struts is less than half of the dimension of the space.

Figure 10:
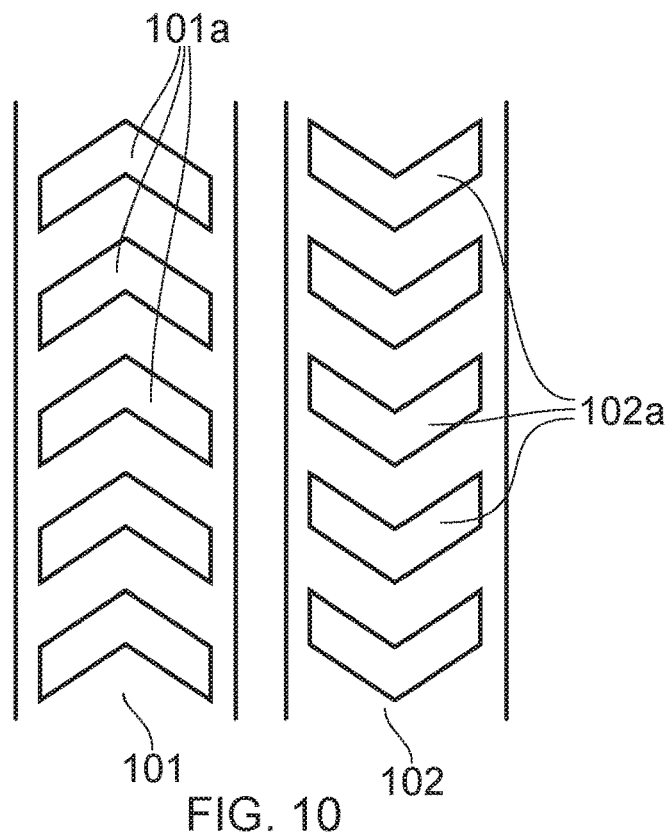
FIG. 10 is a schematic of an eighth embodiment of a coupling in accordance with the present invention.

FIG. 10 shows sections of the first 101 and second 102 component of a coupling in accordance with an embodiment of the invention arranged side by side so that the surface geometry of each component can be seen. In this arrangement, the components 101, 102 are each provided with a single circumferential row of chevron shaped slots. The chevrons 101a are arranged with an opposite angle to the chevrons of 102a. The separation of the chevrons is approximately equal to the dimension from base to the vertex of a chevron such that, as one component rotates relative to another, there is always some alignment between the two oppositely directed rows of chevron shaped slots to allow passage of fluid through the coupling. It will be appreciated that a similar effect could be achieved using multiple rows of oppositely directed chevron shaped slots on each component.

Figure 11:
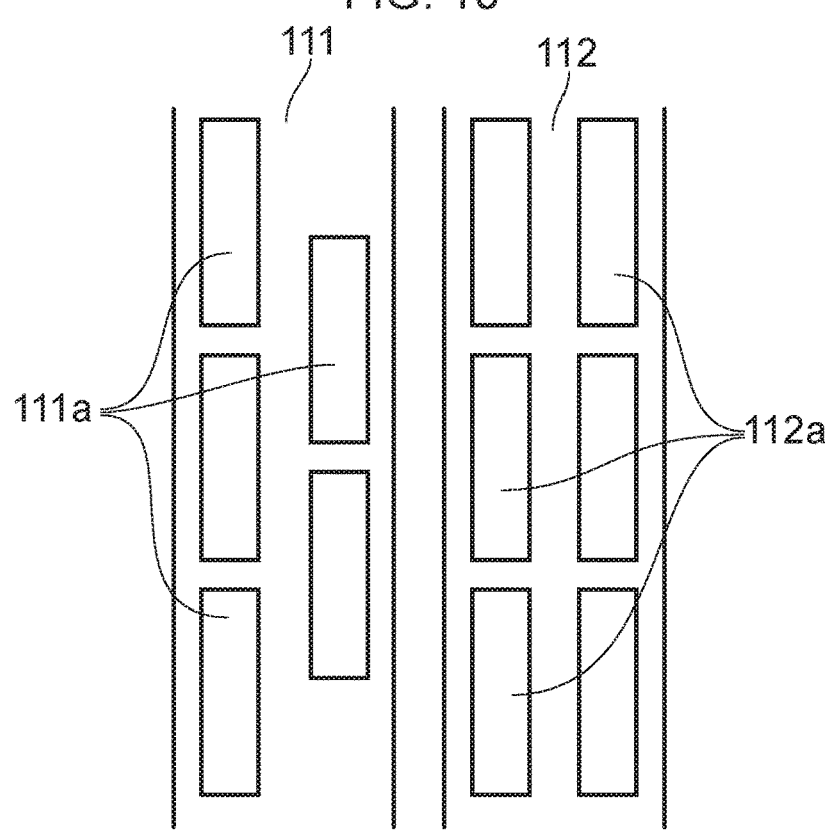
FIG. 11 is a schematic of a ninth embodiment of a coupling in accordance with the present invention.

FIG. 11 shows sections of the first 111 and second 112 component of a coupling in accordance with an embodiment of the invention arranged side by side so that the surface geometry of each component can be seen. In this arrangement, the components 111, 112 are each provided with a circumferentially extending array of elongate slots 111a and 112a. The slots 111a in the first component 111 are arranged in two rows which are staggered, slots of a second row aligning with gaps between slots of a first row. The slots 112a in the second component 112 are arranged in two rows which are in axial and circumferential alignment, that is the ends of slots in a first row align with the ends of slots in the second row. It will be appreciated that as one component rotates relative to the other, at least one row of slots 111a of the first component 111 will always be at least partly aligned with a row of slots 112a in the second component 112 to allow passage of fluid through the coupling. It will be appreciated that a similar effect could be achieved with more than two rows of slots on each component, more than one of which is staggered with respect to an adjacent row.

Whilst the embodiments described above show arrangements where the components of the coupling are concentrically aligned, it will be understood that the port arrangements described can also be beneficially arranged in a coupling which connects two axially adjacent components. In such an arrangement, the ports are arranged to extend axially rather than radially through the circumferential walls of the coupling components. FIG. 12 shows schematically a) a coupling arranged for transferring fluid between two concentrically arranged components, and b) a coupling arranged for transferring fluid between two axially adjacent components.

Figure 12A:
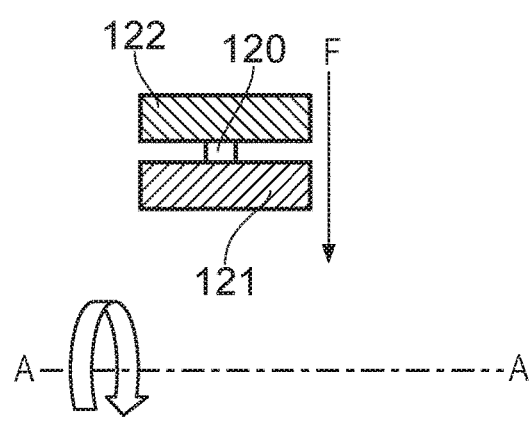
FIGS. 12(a) and 12(b) show schematically the positioning of a coupling of the invention arranged for fluid transfer in each of a concentric and an axial configuration.

As can be seen in FIG. 12(a) a coupling 120 is arranged concentrically with and couples a first rotating element 121 and a second, stationary element 122. The coupling 120, rotating and stationary elements 121, 122 are all concentrically arranged about an axis A-A about which the rotating element 121 and a rotating component (not shown) of the coupling 120 rotate. Fluid is passed between the elements 121, 122 via ports in the coupling 120 in a direction indicated by arrow F.

Figure 12B:
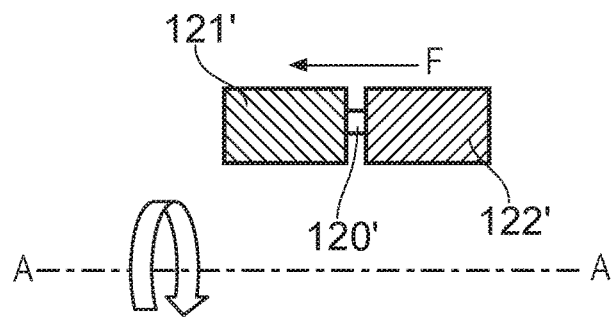

As can be seen in FIG. 12(b) a coupling 120' is arranged axially aligned with and couples a first rotating element 121' and a second, stationary element 122'. The coupling 120', rotating and stationary elements 121', 122' are all co-axially aligned along an axis A-A about which the rotating element 121' and a rotating component (not shown) of the coupling 120' rotate. Fluid is passed between the elements 121', 122' via ports in the coupling 120' in a direction indicated by arrow F.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A transfer coupling comprising a static component and a rotatable component arranged in co-axial alignment, the static component including first ports and the rotatable component including ports second ports, the first and second ports being arranged in a common circumferential plane,
wherein the first and second ports are configured and arranged, in use, to homogenise a flow area for a fluid being transferred through the first and second ports and thereby create a homogenous volume flow,
wherein one of the static component and the rotatable component comprises a circumferential array comprising a first number of ports of a first size, and the other of the static component and the rotatable component comprises a circumferential array comprising a second number of ports of a second size, the first number being smaller than the second number and the first size being larger than the second size, and
wherein the static component and rotatable component are arranged axially adjacent to each other and the first and second ports extend axially.

2. The transfer coupling as claimed in claim 1 wherein the first and second ports have similar packing factors.

3. The transfer coupling as claimed in claim 1 wherein the static component comprises the first number of ports of the first size, and the static component sits radially outboard of the rotatable component.

4. The transfer coupling as claimed in claim 1 wherein the first and second ports have a consistent shape and size.

5. The transfer coupling as claimed in claim 1 wherein the first ports on the static component are arranged at an incline with respect to a radius of the static component.

6. A planetary gear box that includes a rotating shaft that is coupled to a radially outboard static housing by the transfer coupling of claim 1.

7. A gas turbine engine having the planetary gear box of claim 6.

8. The transfer coupling as claimed in claim 1 wherein the second ports on the rotatable component are arranged at an incline with respect to a radius of the rotatable component.

9. A transfer coupling comprising a static component and a rotatable component arranged in co-axial alignment, the static component including first ports and the rotatable component including second ports, the first and second ports being arranged in a common circumferential plane,
  wherein the first and second ports are configured and arranged, in use, to homogenise a flow area for a fluid being transferred through the first and second ports and thereby create a homogenous volume flow,
  wherein one of the static component and the rotatable component comprises a circumferential array comprising a first number of ports of a first size, and the other of the static component and the rotatable component comprises a circumferential array comprising a second number of ports of a second size, the first number being smaller than the second number and the first size being larger than the second size, and
  wherein the rotatable component has an array of the second ports comprising a single row of equally spaced circular ports having a first diameter D, and the static component has an array of the first ports comprising x rows of equally spaced circular ports each having a diameter of about D/x, and x is greater than 1.

10. A transfer coupling comprising a static component and a rotatable component arranged in co-axial alignment, the static component including first ports and the rotatable component including second ports, the first and second ports being arranged in a common circumferential plane,
  wherein the first and second ports are configured and arranged, in use, to homogenise a flow area for a fluid being transferred through the first and second ports and thereby create a homogenous volume flow,
  wherein one of the static component and the rotatable component comprises a circumferential array comprising a first number of ports of a first size, and the other of the static component and the rotatable component comprises a circumferential array comprising a second number of ports of a second size, the first number being smaller than the second number and the first size being larger than the second size, and
  wherein the static component has an array of the first ports comprising a single row of equally spaced circular ports having a first diameter D, and the rotatable component has an array of the second ports comprising x rows of equally spaced circular ports each having a diameter of about D/x, and x is greater than 1.

* * * * *